United States Patent
Hamada (10) Patent No.: US 9,518,597 B2
(45) Date of Patent: Dec. 13, 2016

(54) SELF-TAPPING SCREW FOR SOFT METALS

(71) Applicant: AOYAMA SEISAKUSHO CO., LTD., Niwa-Gun (JP)

(72) Inventor: Masahiko Hamada, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 0 days.

(21) Appl. No.: 14/982,564

(22) Filed: Dec. 29, 2015

(65) Prior Publication Data

US 2016/0131171 A1   May 12, 2016

Related U.S. Application Data (63) Continuation of application No. PCT/JP2015/050124, filed on Jan. 6, 2015.

(30) Foreign Application Priority Data

Jul. 28, 2014  (JP) .................................. 2014-152978

(51) Int. Cl.
*F16B 25/00*  (2006.01)

(52) U.S. Cl.
CPC ........... *F16B 25/0021* (2013.01); *F16B 25/00* (2013.01)

(58) Field of Classification Search
CPC ... F16B 25/00; F16B 25/0021; F16B 25/0031; F16B 25/0052; F16B 25/0057

(Continued)

(56) References Cited

U.S. PATENT DOCUMENTS 3,083,609 A * 4/1963 Lovisek ............... F16B 25/0031
                                                              411/386
4,572,875 A * 2/1986 Gutshall ................ B21H 3/027
                                                              428/577

(Continued)

FOREIGN PATENT DOCUMENTS

JP       50-35567 A1    4/1975
JP       60-54823 U     4/1985

(Continued)

OTHER PUBLICATIONS

International Search Report (Application No. PCT/JP2015/050124) dated Feb. 10, 2015 (with English translation as authored by Applicant's Japanese representative).

*Primary Examiner* — Roberta Delisle
(74) *Attorney, Agent, or Firm* — Burr & Brown, PLLC (57) ABSTRACT

A self-tapping screw for soft metals having low required initial driving torque, high axial force in the tightened state, small axial force reduction due to heat or the like, and a low manufacturing cost because no intricate and expensive mold is required, and also has an advantage that an amount of produced chip powder is small. The self-tapping screw includes a tapered smaller diameter part at an end of a shaft. The smaller diameter part is inserted and driven into a pilot hole formed in a soft metal to form a female screw in the pilot hole. In the shaft and the smaller diameter part, a continuous male screw with a constant pitch is formed. A thread ridge of the male screw of the smaller diameter part is provided with multiple sets of a largest diameter part and an increasing diameter part, the largest diameter part having a stepped part at a position on a trailing side of the largest diameter part during driven turning of the screw, the increasing diameter part having a gradually increasing diameter from the stepped part to a next largest diameter part.

4 Claims, 8 Drawing Sheets (58) Field of Classification Search
USPC ............... 411/386, 387.4, 411, 415, 426
See application file for complete search history.

(56) References Cited

U.S. PATENT DOCUMENTS

| | | | | |
|---|---|---|---|---|
| 5,141,376 | A * | 8/1992 | Williams | F16B 25/0021 |
| | | | | 411/387.4 |
| 6,158,939 | A * | 12/2000 | Grossberndt | F16B 25/0047 |
| | | | | 411/387.4 |
| 6,945,729 | B2 * | 9/2005 | Yasuda | F16B 25/0021 |
| | | | | 403/408.1 |
| 7,214,020 | B2 * | 5/2007 | Suzuki | F16B 25/0021 |
| | | | | 411/308 |
| 7,959,393 | B2 * | 6/2011 | Ambros | F16B 25/0005 |
| | | | | 411/386 |
| 2003/0143058 | A1 | 7/2003 | Takahashi et al. | |
| 2004/0081535 | A1 * | 4/2004 | Birkelbach | F16B 25/0047 |
| | | | | 411/411 |
| 2006/0039775 | A1 | 2/2006 | Mizuno et al. | |

FOREIGN PATENT DOCUMENTS

| | | |
|---|---|---|
| JP | 10-103321 A1 | 4/1998 |
| JP | 11-247817 A1 | 9/1999 |
| JP | 2003-222116 A1 | 8/2003 |
| JP | 2008-095773 A1 | 4/2008 |
| JP | 4219247 B2 | 2/2009 |

* cited by examiner

PRIOR ART

SELF-TAPPING SCREW FOR SOFT METALS

BACKGROUND OF THE INVENTION

Field of the Invention

The present invention relates to a self-tapping screw for soft metals that is used for soft metals, such as aluminum alloys and magnesium alloys.

Description of the Invention

A self-tapping screw is a screw that can be driven into a pilot hole formed in a mating member, so that it can be tightened while creating a female screw on the inner surface of a pilot hole. The self-tapping screw has been widely used because of its feature of requiring no tapping process in advance in the pilot hole.

The self-tapping screw has been required to be capable of being driven by minimum possible initial driving torque. In this context, one commercially available self-tapping screw has a shaft with a polygonal cross section achieving a smaller contact area with the pilot hole as described in Patent Literature 1.

Unfortunately, there has been a problem in that such a self-tapping screw having a non-circular cross section needs to be manufactured with an intricate and expensive mold, and thus requires a higher manufacturing cost than standard screws. In addition, the shaft of the self-tapping screw having a non-circular cross section has a male screw that does not mate with the female screw as the mating member evenly over the entire circumference even in the fully tightened state. More specifically, the male screw tightly mates with the female screw at the apexes of the polygon, and not at a portion between the apexes. All things considered, there has been a problem in that axial force in the tightened state is more likely to be reduced due to heat or the like, compared with standard screws having circular cross sections.

Conventional self-tapping screws are supposed to be mated with a mating member made of steel, and thus have sharp cutting edges as described in Patent Literature 2. Thus, when such a screw is driven into soft metals, such as aluminum alloys and magnesium alloys, a large amount of chip powder is produced due to excessive tapping. In particular, when the mating member is made of a magnesium alloy, chip powder produced might catch fire in a certain environment.

CITATION LIST

Patent Literature

Patent Literature 1: Japanese Patent Application Publication No. 1999-247817
Patent Literature 2: Japanese Patent No. 4219247

SUMMARY OF INVENTION

Technical Problem

In view of the foregoing, it is an object of the present invention to solve the disadvantages in related art and provide a self-tapping screw for soft metals that involves low initial driving torque, exhibits high axial force in the tightened state, requires no intricate and expensive molds and can be manufactured at a low cost, and with which the amount of chip powder produced is reduced.

Solution to Problem

According to the present invention developed to solve the above-described disadvantages, a self-tapping screw includes a tapered smaller diameter part at an end of a shaft. The smaller diameter part is inserted and driven into a pilot hole formed in a soft metal to form a female screw in the pilot hole. A continuous male screw with a constant pitch is formed in the shaft and the smaller diameter part. A thread ridge of the male screw of the smaller diameter part is provided with multiple sets of a largest diameter part and an increasing diameter part, the largest diameter part having a stepped part at a position on a trailing side of the largest diameter part during driven turning of the screw, the increasing diameter part having a gradually increasing diameter from the stepped part to a next largest diameter part.

It is preferable that the increasing diameter part have a minimum diameter falling within a range of 30% to 80% of a thread ridge height of the male screw at the corresponding position. It is also preferable that the multiple sets include three to eight sets.

It is sufficient that the thread angle of the male screw be 60°, which is the same as in standard screws, and more preferably 15° to 45°.

Advantageous Effects of Invention

The self-tapping screw for soft metals according to the present invention includes the shaft and the smaller diameter part the cross-sectional shape of which is circular like standard screws. The self-tapping screw therefore requires no intricate and expensive molds and can be manufactured at a low cost. In addition, the male screw tightly mates with the female screw along the entire circumference, and thus the axial force in the tightened state is maintained at a high level. Furthermore, the thread ridge of the male screw of the smaller diameter part is provided with multiple sets of the largest diameter part having the stepped part at the position on the trailing side of the largest diameter part during the driven turning of the screw and the increasing diameter part having a gradually increasing diameter from the stepped part to the next largest diameter part, and thus the inner surface of the pilot hole in a soft metal is plastically deformed by the increasing diameter part having a gradually increasing diameter and the following largest diameter part during the driven turning of the screw, whereby a female screw is created. In this process, the largest diameter part comes into contact with the inner surface of the pilot hole at only several areas, whereby the initial driving torque can be reduced.

The self-tapping screw for soft metals according to the present invention does not have cutting edges on the front side in the driven turning direction unlike conventional screws. The amount of chip powder produced can be thus reduced even when soft metals, such as aluminum alloys and magnesium alloys, are employed. Chip powder can be discharged into or through a gap formed on the outer circumference of the increasing diameter part.

DETAILED DESCRIPTION OF THE INVENTION

Preferred embodiments of the present invention will be described below.

Figure 1:
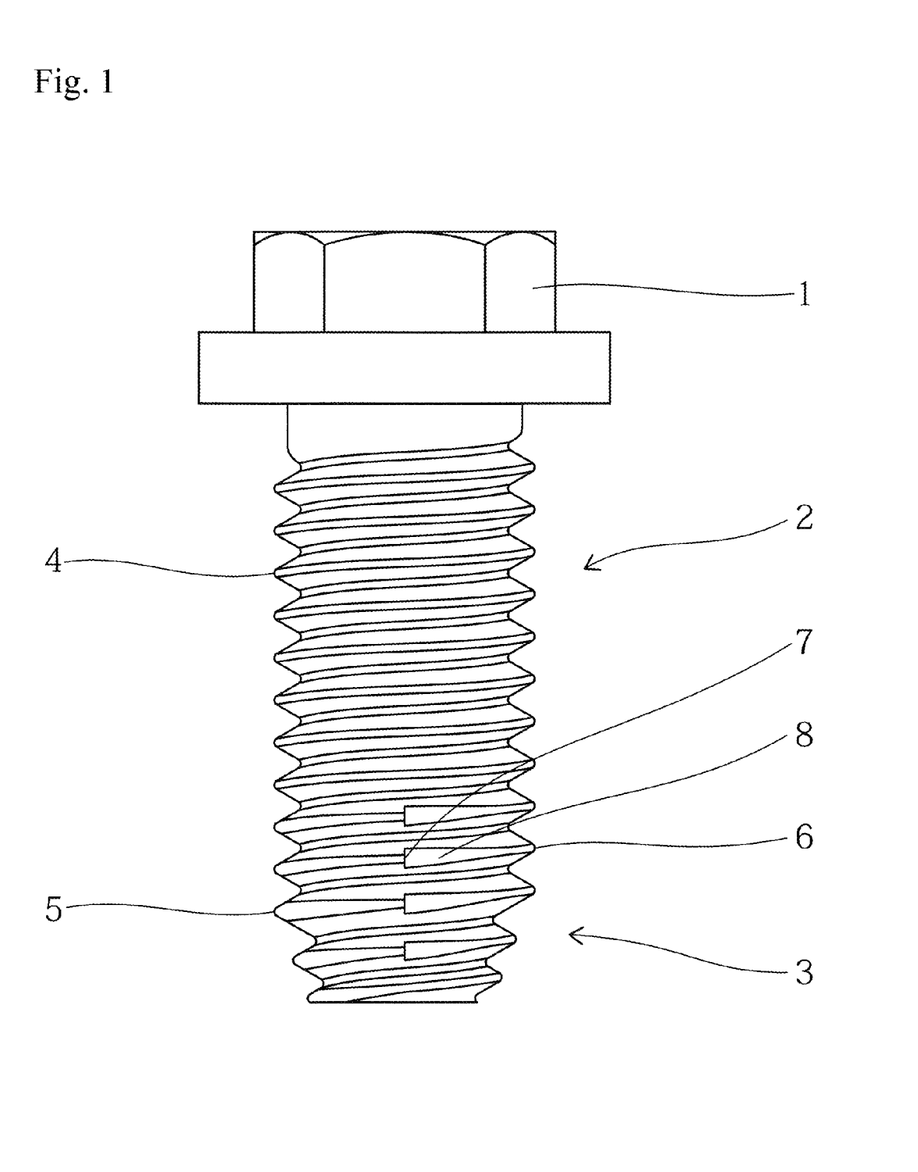
FIG. 1 is a diagram illustrating an entire self-tapping screw for soft metals according to an embodiment.

FIG. 1 is a diagram illustrating an entire self-tapping screw for soft metals according to an embodiment, including a head 1, a shaft 2 having a circular cross section and a constant diameter, and a tapered smaller diameter part 3 at an end of the shaft 2. In the shaft 2 and the smaller diameter part 3, a continuous male screw with a constant pitch is formed as in conventional cases. The male screw of the shaft 2 has a complete thread with a thread ridge 4 having a constant diameter, whereas the male screw of the smaller diameter part 3 has a thread ridge 5 with a diameter gradually reducing toward the end. The self-tapping screw for soft metals of the present invention is not a screw having a non-circular cross section, and thus requires no intricate and expensive mold and can be manufactured at a low cost.

Figure 2:
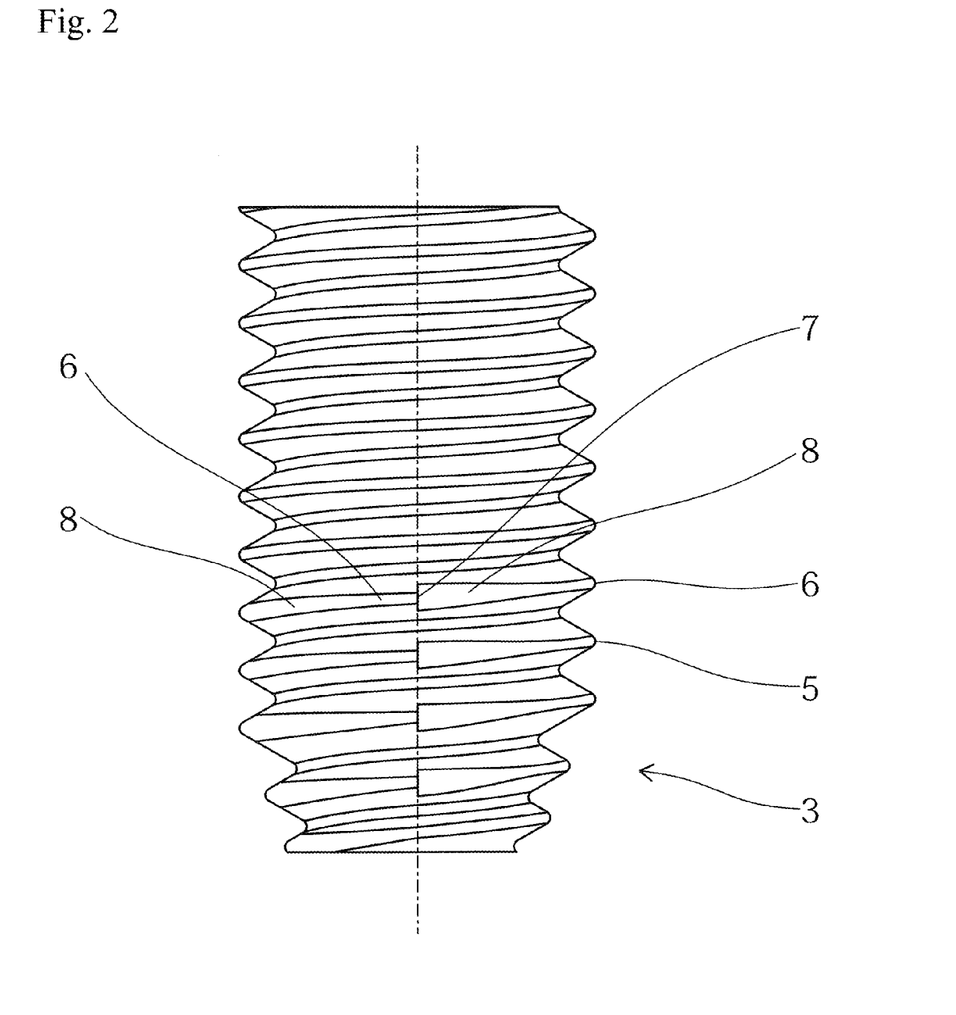
FIG. 2 is an enlarged front view of a smaller diameter part.
Figure 3:
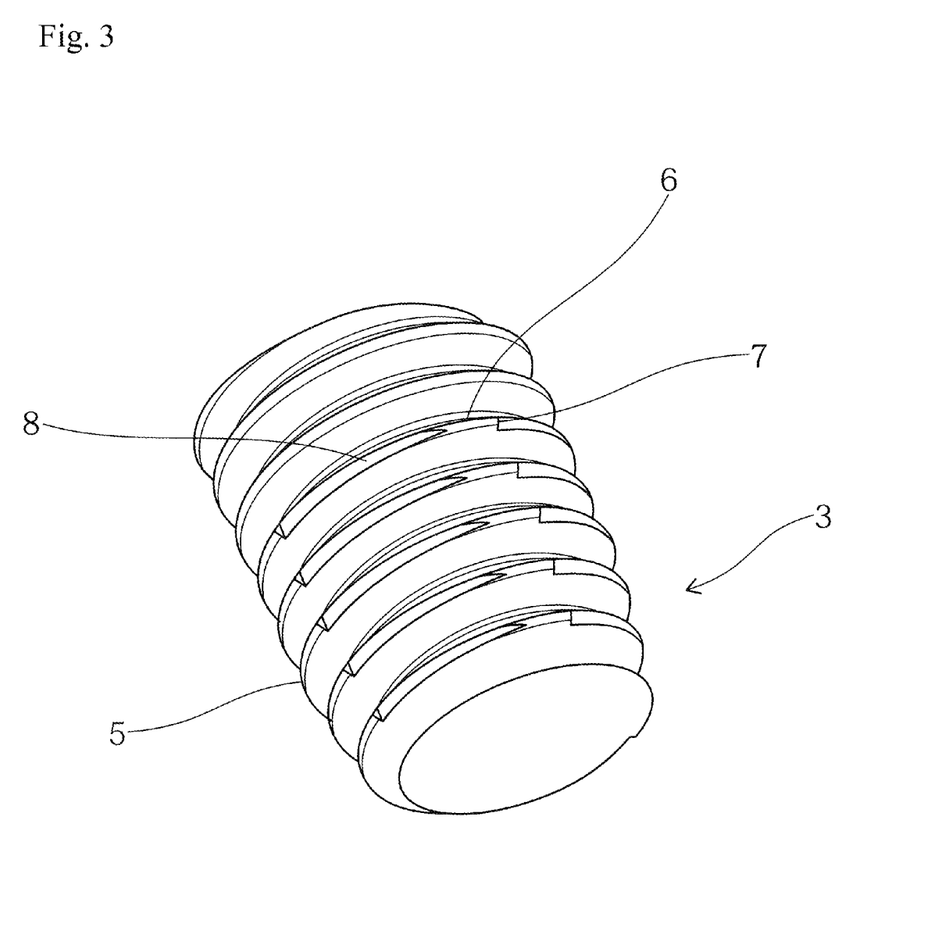
FIG. 3 is an enlarged perspective view of the smaller diameter part.
Figure 4:
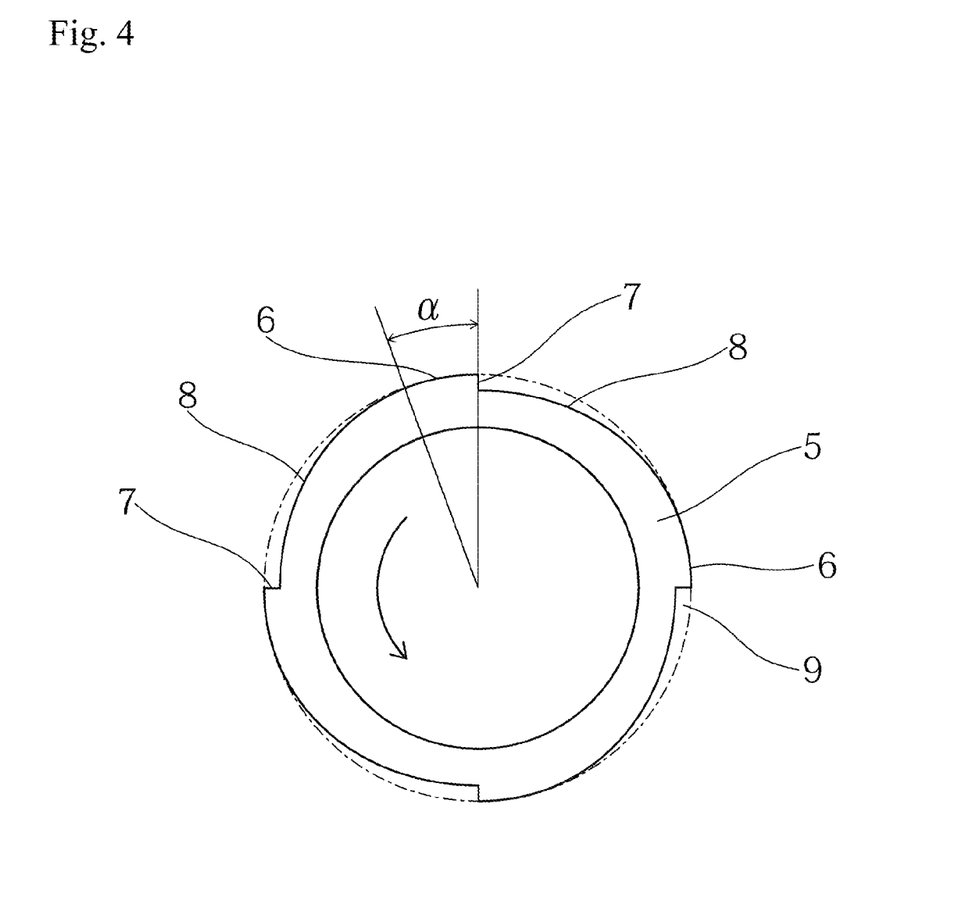
FIG. 4 is a bottom view of the smaller diameter part taken along a plane perpendicular to an axial line.

FIG. 2 is an enlarged front view of the smaller diameter part 3 and FIG. 3 is a perspective view of the smaller diameter part 3. As illustrated in these figures, the thread ridge 5 of the male screw of the smaller diameter part 3 is provided with multiple sets of projecting and recessed parts achieving a tapping function. Specifically, a largest diameter part 6 extends for a predetermined angle α in the circumferential direction. As shown in FIG. 4, the largest diameter part 6 has the same diameter as the edge diameter (ridge diameter) of the thread ridge 5 at the corresponding position. FIG. 4 is a bottom view of the smaller diameter part 3 taken along a plane perpendicular to an axial line, and the head 1 is on the back side of the paper of FIG. 4, and the driving direction of a right-hand screw is counterclockwise as shown indicated by an arrow.

At the position on the trailing side of the largest diameter part 6 during the driven turning of the screw, a stepped part 7 is formed at which the diameter is reduced substantially vertically. From the bottom of the stepped part 7, the diameter gradually increases toward the next largest diameter part 6 to form an increasing diameter part 8. Thus, a gap 9 is formed outside the increasing diameter part 8. Chip powder can be discharged into or through the gap 9. The minimum diameter of the stepped part 7 preferably falls within a range of 30% to 80% of the thread ridge height of the male screw at the corresponding cross-sectional position. This range is defined because a value higher than 80% of the thread ridge height will result in lowered tapping capability and a value smaller than 30% will cause severe metal wear.

The projecting and recessed parts, formed in the thread ridge 5 of the male screw of the smaller diameter part 3, for achieving the tapping function include the largest diameter part 6, the stepped part 7, and the increasing diameter part 8. The number of sets of projecting and recessed parts in an equal interval, which is four in the present embodiment, may be selected from a range between three to eight. This range is defined because two sets cannot ensure sufficient stability during the driving of the thread and nine or more sets define a substantially circular shape, resulting in a degraded tapping function.

Figure 9:
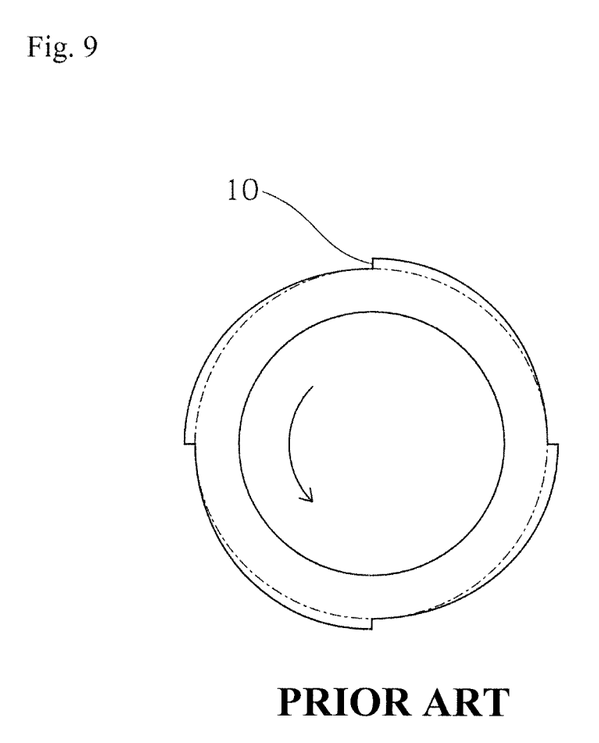
FIG. 9 is a bottom view of a smaller diameter part of a conventional self-tapping screw for steel, taken along a plane perpendicular to the axial line.

A conventional self-tapping screw for steel described in Patent Literature 2 is illustrated in FIG. 9 for a reference purpose. The conventional screw includes cutting edges 10 formed at the position on the leading side of the screw being driven to be turned. The cutting edges 10 are used for cutting the inner surface of a pilot hole formed in a steel member. The cutting edges 10 are however not suitable for soft metals, such as aluminum alloys and magnesium alloys, because the cutting edges 10 can excessively carve the inner surface of the pilot hole and produce a large amount of chip powder as described in an example below.

Figure 5:
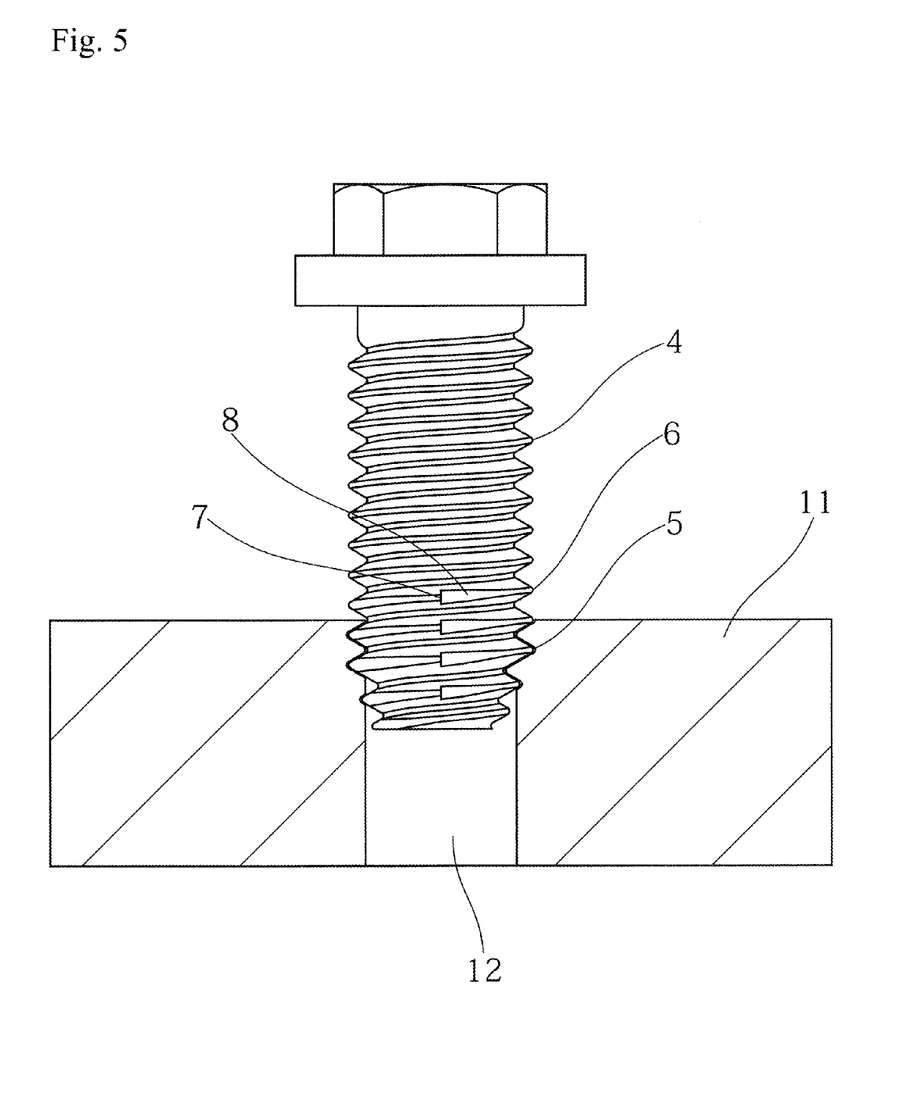
FIG. 5 is a schematic for explaining a driving state.

The thus-configured self-tapping screw for soft metals according to the present invention, having the configuration described above, is driven into a pilot hole 12 formed in a soft metal 11, such as an aluminum alloy or a magnesium alloy, to be used as shown in FIG. 5. The largest diameter part 6 as a portion of the projecting and recessed parts formed in the smaller diameter part 3, deeply taps the inner circumference of the pilot hole 12 to cause plastic deformation. Then, the portion above the smaller diameter part 3 gradually taps. As a result, a female screw is created that has the thread bottom corresponding to the thread ridge 4 of the shaft 2. During the self-tapping, the inner surface of the pilot hole 12 is pushed open by the increasing diameter part 8 with a diameter gradually increasing from the bottom of the stepped part 7, so as not to produce a large amount of chip powder. Furthermore, chip powder that had to be inevitably produced is discharged through the gap 9 formed on the trailing side of the stepped part 7.

In addition, positions where the largest diameter part 6 taps the inner circumference of the pilot hole 12 are not along the entire circumference of the pilot hole but limited to four areas in the present embodiment, so that the required initial driving torque can be small. In addition, final tightening is achieved by the complete screw of the shaft 2, and thus the axial force in the tightened state that is the same as that of standard screws can be achieved.

To check the functions of the self-tapping screw for soft metals according to the present invention, a self-tapping screw for soft metals having the structure described in the above-mentioned embodiment was compared with a self-tapping screw having a triangular cross section as described in Patent Literature 1 in terms of driving torque, fracture torque, and maximum axial force. The screw size used was JIS M6. Aluminum alloy plates with pilot holes having diameters of 5.2 to 5.8 mm were used for the test.

Figure 6:
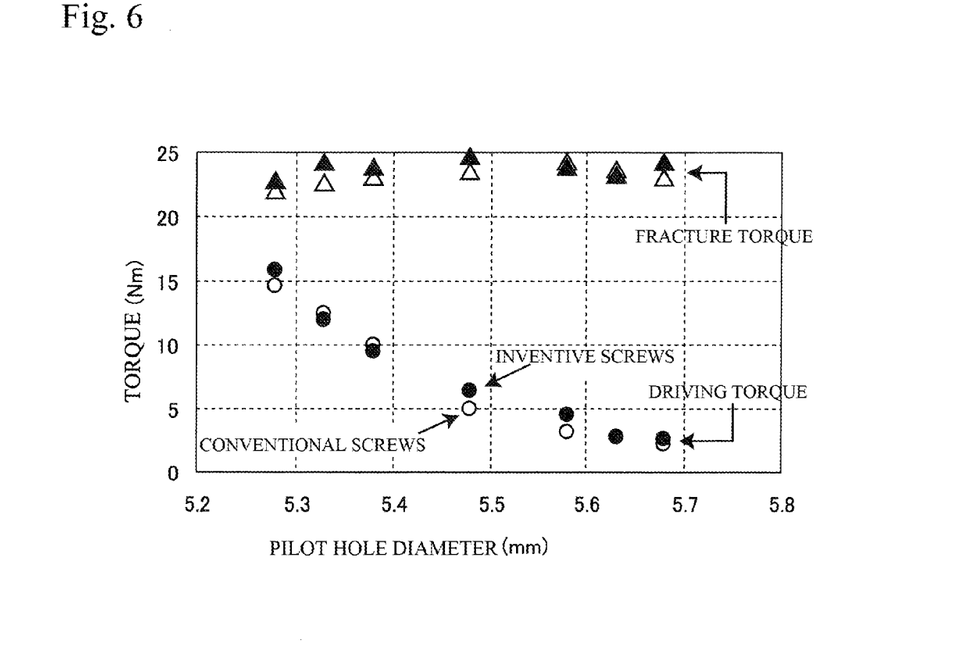
FIG. 6 is a graph depicting measured values of driving torque and fracture torque.

FIG. 6 shows measured values of driving torque and fracture torque. The outlined circles and triangles represent the test results of self-tapping screws according to Patent Literature 1, whereas the black circles and triangles represent the test results of self-tapping screws according to the present invention. As shown in FIG. 6, no significant difference was found between both types of screws.

Figure 7:
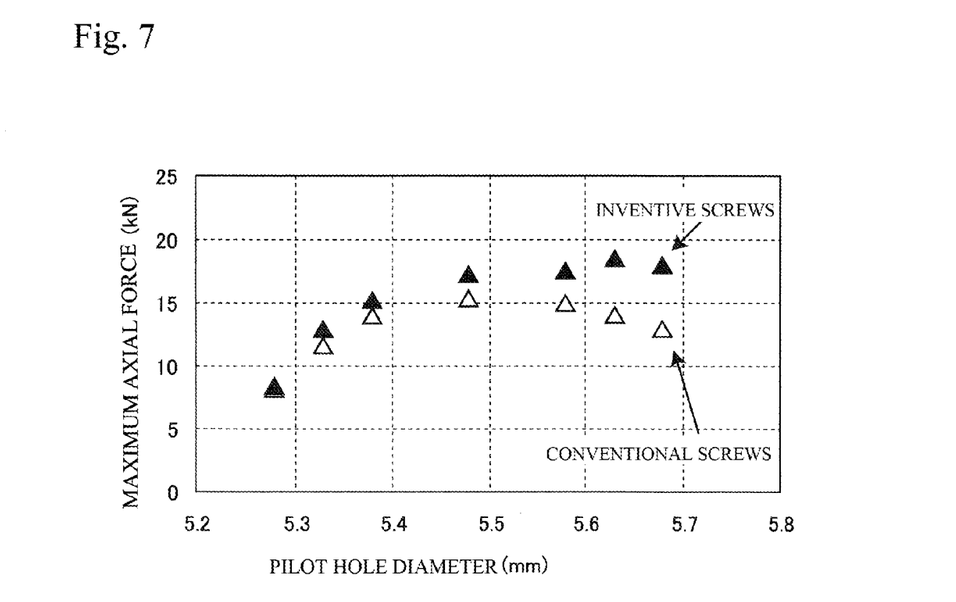
FIG. 7 is a graph depicting measured values of maximum axial force.

Similarly, maximum axial force was measured. FIG. 7 shows the test results. The maximum axial force of self-tapping screws according to Patent Literature 1, represented by the outlined triangles decreased as the pilot hole diameter increased. This is because, as described above, the apexes serving as the only contact areas damage the threads that have been formed when axial force is produced, resulting in increased torque.

Next, the amount of chip powder produced during the driving and loosening of the screws was compared. In this test, the self-tapping screw having a triangular cross section as described in Patent Literature 1 and a self-tapping screw having forward cutting edges as described in Patent Literature 2 were used as well as the screw according to the present invention. Aluminum alloy plates with pilot through holes of three sizes were prepared. The amount of chip powder that dropped below through the holes during the driving and loosening of the screws was visually observed, and the results were evaluated on a scale of ten to one.

Table 1 lists the results. The self-tapping screw having forward cutting edges as described in Patent Literature 2 produced a large amount of chip powder. The self-tapping screw having a triangular cross section as described in Patent Literature 1 produced a smaller amount of chip powder. The self-tapping screw according to the present invention produced a far smaller amount of chip powder and, in particular, produced only a negligible amount of chip powder during the fastening of the screw, which can cause a problem in practical use.

TABLE 1

| Pilot hole diameter | Patent Literature 1 | | Patent Literature 2 | | Present Invention | |
|---|---|---|---|---|---|---|
| | Loosening | Fastening | Loosening | Fastening | Loosening | Fastening |
| 5.33 mm | 8 | 5 | 10 | 4 | 7 | 3 |
| 5.48 mm | 7 | 1 | 9 | 3 | 7 | 1 |
| 5.63 mm | 8 | 1 | 10 | 3 | 6 | 1 |

Figure 8:
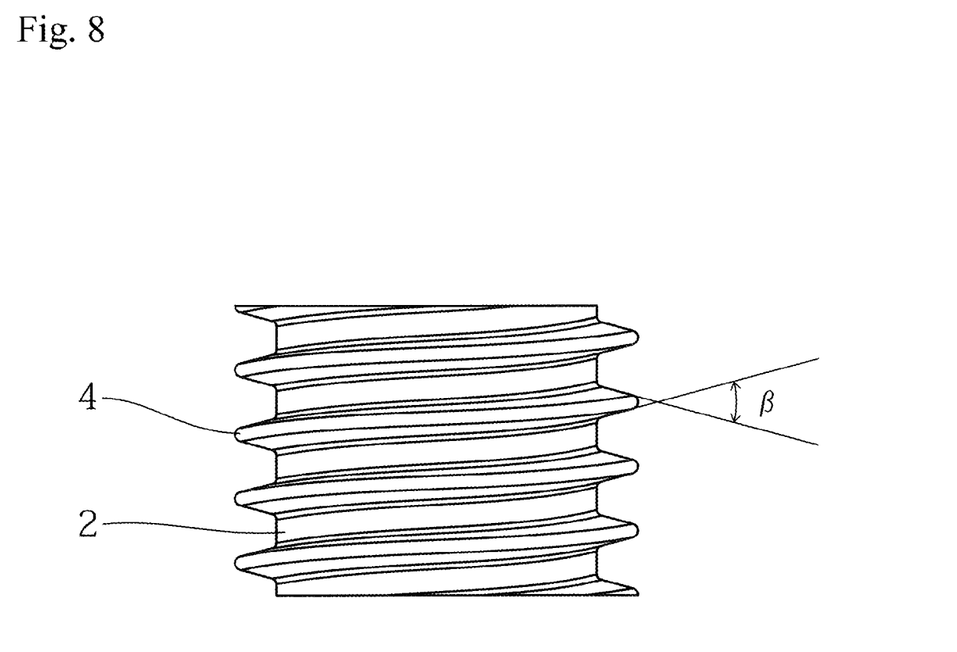
FIG. 8 is a front view of a shaft with a reduced thread angle.

In the first embodiment described above, the thread angle of the male screw formed in the shaft 2 and the smaller diameter part 3 was 60°, as in conventional cases. In a second embodiment, a thread angle β was 15° to 45° as illustrated in FIG. 8. With this small thread angle β, the screw has a sharpened end that leads to smaller driving torque and a smaller amount of chip powder produced.

As described above, the self-tapping screw for soft metals according to the present invention features low required driving torque, high maximum axial force, small axial force reduction due to heat or the like, and a low manufacturing cost, and also has distinctive advantages including the reduced amount of chip powder produced.

REFERENCE SIGNS LIST

1 head
2 shaft
3 smaller diameter part
4 thread ridge
5 thread ridge
6 largest diameter part
7 stepped part
8 increasing diameter part
9 gap
10 cutting edge
11 soft metal
12 pilot hole

The invention claimed is:

1. A self-tapping screw for soft metals comprising a tapered smaller diameter part at an end of a shaft, the smaller diameter part is configured to be inserted and driven in a driving direction such that a leading side of a thread ridge of a continuous male screw is turned into a pilot hole formed in a soft metal to form a female screw in the pilot hole, wherein
   the continuous male screw having a constant pitch is formed in the shaft and the smaller diameter part, and
   the thread ridge of the male screw of the smaller diameter part is provided with multiple sets of an increasing diameter part on the leading side of the thread ridge in the driving direction such that the increasing diameter part gradually increases in diameter to form a largest diameter part, the largest diameter part having a stepped part at a position on a trailing side of the thread ridge in the driving direction during driven turning of the screw, with a next increasing diameter part gradually increasing in diameter from the stepped part to form a next largest diameter part in the thread ridge of the smaller diameter part.

2. The self-tapping screw for soft metals according to claim 1, wherein the increasing diameter part has a minimum diameter falling within a range of 30% to 80% of a thread ridge height of the male screw at the corresponding position.

3. The self-tapping screw for soft metals according to claim 1, wherein the multiple sets include three to eight sets.

4. The self-tapping screw for soft metals according to claim 1, wherein the male screw has a thread angle of 15° to 45°.

* * * * *